United States Patent [19]

Knopf

[11] Patent Number: 4,517,145
[45] Date of Patent: May 14, 1985

[54] EXTRUSION DIE AND PROCESS FOR THICKNESS CONTROL

[75] Inventor: William H. Knopf, Taylors, S.C.
[73] Assignee: American Hoechst Corporation, Somerville, N.J.
[21] Appl. No.: 549,097
[22] Filed: Nov. 7, 1983
[51] Int. Cl.³ .............................................. B29D 7/22
[52] U.S. Cl. .................... 264/40.2; 264/209.4; 425/140; 425/141; 425/172
[58] Field of Search .................. 264/40.2, 40.1, 209.4; 425/140, 141, 174.2, 172

[56] References Cited

U.S. PATENT DOCUMENTS

| | | | |
|---|---|---|---|
| 3,974,248 | 8/1976 | Atkinson | 264/40.2 |
| 3,988,582 | 10/1976 | Harman | 425/141 |
| 4,086,044 | 4/1978 | Sikora | 425/141 |
| 4,152,380 | 5/1979 | Graves et al. | 264/40.1 |
| 4,157,503 | 6/1979 | Brunner | 264/40.1 |
| 4,409,160 | 10/1983 | Kogo et al. | 264/40.1 |

FOREIGN PATENT DOCUMENTS

| | | | |
|---|---|---|---|
| 2427340 | 1/1975 | Fed. Rep. of Germany | 425/140 |
| 2505221 | 8/1976 | Fed. Rep. of Germany | 425/141 |
| 74639 | 7/1970 | German Democratic Rep. | 425/141 |
| 54-150471 | 11/1979 | Japan | 264/40.1 |
| 56-49222 | 5/1981 | Japan | 425/141 |
| 58-29623 | 2/1983 | Japan | 425/141 |

Primary Examiner—Jeffery Thurlow
Attorney, Agent, or Firm—James C. Lydon

[57] ABSTRACT

An improved extrusion die employing proximity sensors to directly measure the actual die gap during extrusion is disclosed. The proximity sensor may be a capacitance-effect, or optical-effect sensor. Manual and automated closed-loop methods of operation are also disclosed.

14 Claims, 1 Drawing Figure

EXTRUSION DIE AND PROCESS FOR THICKNESS CONTROL

BACKGROUND OF THE INVENTION

The present invention relates to an improved extrusion die whose actual die gap is continuously measured while polymeric melt is flowing through the die. More particularly, the present invention is directed to an adjustable gap extrusion die containing high temperature resistant proximity sensors located within the die.

Normally, in an apparatus for producing plastic sheet-like material such as plastic film, as shown in FIG. 1, a die having a plurality of bolts 10 for controlling the gap between the die lips is employed. A typical die gap is 80 mils (0.080 inch) with an adjustment range of plus or minus 10 mils. A molten plastic, for example, poly(ethylene terephthalate), is introduced into the die through an inlet 20 by a pump (not shown), extruded through a gap between a pair of die lips 13A and 13B, and is solidified to form a sheet-like material. The thickness of the plastic sheet produced by the above-described process is greatly influenced by the gap between lips 13A and 13B. More particularly, the distribution or pattern of thickness in the transverse direction of the sheet is primarily determined by the distribution of the gap between the die lips across the width of the die, hereinafter referred to as "die gap distribution."

Die gap distribution is controlled by rotation of adjustment bolts 10, thereby selectively pressing or pulling die lips 13A and 13B together or apart. However, because the die lips are typically made of one piece of monolithic metal, it is impossible to adjust one bolt precisely to the desired die gap thickness without altering the die gap thickness in the region of adjacent adjustment bolts 10. Because of this interaction it is extremely difficult to adjust die lips 13A and 13B to achieve the desired die distribution, even before the die is put into operation. The problem of accurate die gap adjustment is exacerbated by the non-linear performance of adjusting bolts 10, which display a "dead zone" and a "non-linear zone" in which adjustment of the bolt produces little or no change in the die gap thickness. These zones of non-linear performance, caused by thread tolerances and wear, are typically between one-half and a full bolt rotation.

With sufficient patience and time, an experienced worker can achieve the desired initial die gap distribution by a trial and error approach, first adjusting an adjustment bolt 10, then measuring the actual die gap distribution, readjusting the same or a different adjustment bolt 10, measuring the resulting die gap distribution, and so on until an acceptable die gap distribution is achieved. This procedure is often performed after the die has been heated to operating temperature (typically from 275° to 325° C.) to take into account any thermal effects upon die gap distribution.

Unfortunately, the desired die gap distribution may change during operation of the die i.e. with polymeric melt flowing through the die gap. Five to ten percent variation in die gap distribution during die operation is not uncommon.

The prior art has generally attempted to solve this problem by measuring the thickness of the finished plastic sheet or film across its width downstream from the die lips, hereinafter called "film thickness distribution," readjusting one or more of adjustment bolts 10, remeasuring the film thickness distribution, and so on until the film thickness distribution was once again within acceptable limits. T. Akatsuka et al., "Apparatus For Controlling The Gap Between Lips Of A Die For Extruding A Plastic Sheet Material," U.S. Pat. No. 4,124,342 (Nov. 7, 1978) discloses an automated system for control of film thickness distribution which employs an algorithm to calculate the number of turns each adjustment bolt 10 requires to achieve a desired die gap distribution and therefore the desired film thickness distribution. One of the disadvantages of such a system is the assumption that each die bolt response is uniform.

There have been several improvements in control of die gap adjustment as opposed to actual die gap measurement.

R. Mules, "Apparatus For Making Polymeric Film," U.S. Pat. No. 3,920,365 (Nov. 18, 1975) discloses control of film thickness distribution by selective thermal control of isolated or localized portions of die lips 13A and 13B by employing temperature sensors and heating elements embedded therein. By controlling localized temperature variations, the local melt viscosity, and hence local mass flow rate, of the polymeric material may be increased or decreased to maintain the film thickness distribution within acceptable limits.

R. Lowey, Jr., "Plastic Extrusion Die," U.S. Pat. No. 2,938,201 (May 31, 1960) discloses an adjustable sheet forming extrusion die having expandable adjustment bolts which may be finely adjusted by means of electric heaters which control the length of each bolt between its mounting in the die body, and the bolt juncture points in the die blades.

P. Farmer et al., "Extrusion Die Blade," U.S. Pat. No. 4,252,519 (Feb. 24, 1981) discloses replacement of the expandable adjustment bolts of Lowey with a thermally adjustable die blade with a heat barrier to minimize the effect of temperature variations on the temperature of the die blade lip.

P. Peterson et al., "Apparatus For Measuring Variations In Thickness Of Elongated Samples Of Thin Plastic Film," U.S. Pat. No. 3,764,899 (Oct. 9, 1973) discloses the use of a small area capacitance-effect electrode which is capable of measuring variations in the thickness of a dielectric material such as plastic film.

Die gap measurement and adjustment problems are not limited to sheet-forming extrusion dies, but rather may be encountered with adjustable dies of virtually any configuration.

P. Reitemeyer et al., "Apparatus For The Extrusion Of Tubular Bodies Of Synthetic Resin Material," U.S. Pat. No. 4,137,028 (Jan. 30, 1979) discloses an extrusion die for forming tubular plastic materials which employs a radioactive source located centrally within the tube and plurality of detector means located on the outside calibration sleeve. The radioactivity measurements so obtained are employed to maintain the inner or mandrel die in a centered position, thereby assuring a uniform thickness of the tubular material being extruded.

SUMMARY OF THE INVENTION

In one aspect, the present invention is an improved die comprising
(a) a plurality of inner flow surfaces in opposed relationship to each other, thereby defining a die gap,
(b) means for adjustment of the relationship of said inner flow surface to each other whereby said die gap may be expanded or contracted, (c) at least one proximity sensor, selected from the group consisting of capacitance-effect and optical fiber sensors, mounted within and flush with at least one of said inner flow surfaces, said sensor possessing a working surface substantially as smooth as said inner flow surface, such that the actual die gap can be measured by said proximity sensor during operation of said adjustable extrusion die.

In another aspect, the present invention is an improved method for the control of melt thickness distribution comprising (i) extruding an extrudate through an adjustable extrusion die having (a) a plurality of inner flow surfaces in opposed relationship to each other, thereby defining a die gap, (b) means for adjustment of the relationship of said inner flow surfaces to each other whereby said die gap may be expanded or contracted, (c) at least one proximity sensor, selected from the group consisting of capacitance-effect and optical fiber sensors, mounted within and flush with at least one of said inner flow surfaces, said sensor possessing a working surface substantially as smooth as said inner flow surface, such that the actual die gap can be measured by said proximity sensor during operation of said adjustable extrusion die;

(ii) measuring the actual die gap while said extrudate is being extruded through said die.

DETAILED DESCRIPTION OF THE INVENTION

Figure 1:
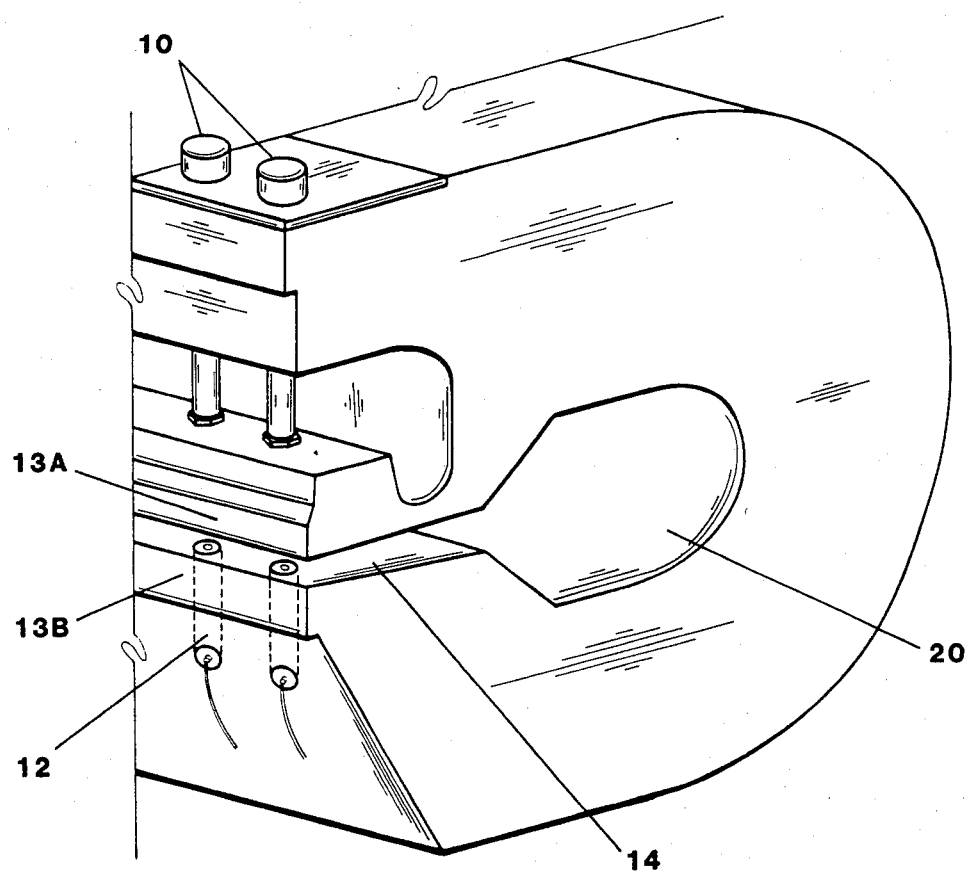
FIG. 1 illustrates an embodiment of the present invention, and is a portion of a perspective of a sheet forming extrusion die with a plurality of flush mounted proximity sensors showing each sensor aligned with an adjustment bolt.

As summarized above, one aspect of the present invention is an improved die comprising an adjustable extrusion die with at least one proximity sensor selected from the group consisting of capacitance sensors and optical sensors mounted flush with the inside flow surface of the die. The adjustable extrusion die may be a tubular-forming die, a sheet-forming die, or an adjustable die designed to produce any other configuration. Adjustable dies are well known to workers in the extrusion arts.

The proximity sensors employed in the present invention must be capable of reliable, accurate operation at the typical operating pressure and temperatures of an adjustable extrusion die (typically up to 325° C. for polyester extrusion). Sensors which are accurate and reliable at the elevated temperatures associated with extrusion include capacitance and optical sensors. The inventor believes the relative complexity and fragility of those sensors which employ coils of wire windings, i.e. inductance, reluctance or magnetic sensors, precludes their use in the present invention.

By "capacitance sensors" it is meant that class of sensors which utilize the principle of capacitance to detect the proximity of an object remote from the sensor. Capacitance is defined as the ratio of the charge on the conductors of the capacitor and the potential difference between the two conductors.

The capacitance effect sensors of the present invention preferably use the parallel plate capacitor principle. The electrical capacitance formed between a capacitor plate mounted flush with one of the inner flow surfaces of the die and the opposite inner flow surface will vary as a function of the displacement or gap between the two surfaces as follows:

$$C \alpha K\, A/D \quad \text{I}$$

where
C is the capacitance;
K is the dielectric constant of the medium between the capacitor plate and the opposite inner flow surface;
A is the capacitor plate area, and
D is the distance from the flush mounted capacitance plate to the opposite inner flow surface.

To prevent interference a guard ring is placed around the perimeter of the capacitor plate.

In practice, alternating current, rather than direct current, is supplied to the capacitive-effect sensor. The capacitor created by the plate of the sensor probe, the opposing inner flow surface, and the dielectric between them will constantly charge and discharge in opposition to the alternating current applied to it. This opposition to current flow is known as capacitive reactance, and is expressed in ohms;

$$X_c \alpha \frac{1}{2\pi f c} \alpha \frac{0.1592}{fc} \quad \text{II}$$

where
$X_c$ = capacitive reactance
f = frequency of the alternating current
c = capacitance of the capacitor If the ac frequency is maintained as a constant, the capacitive reactance is inversely proportional to the capacitance only. If the previous equation for capacitance is combined with the above equation for reactive capacitance, it is seen that the capacitive reactance of the capacitor formed by the plate of the sensor probe, the opposing inner surface and the dielectric between them is directly proportional to the distance between the plate of the sensor probe and the opposing inner flow surface of the extrusion die:

$$X_c \alpha \frac{0.1592}{fc} \alpha \frac{0.1592}{fKA/D} \alpha BD \quad \text{III}$$

where
B is a constant resulting from the combination of the fixed frequency (f), fixed dielectric of the extrulate (K), fixed area of the capacitor plate (A) and 0.1592,
D is the distance from the flush mounted capacitance plate to the opposite inner flow surface, or the actual die gap of the extrusion die at the location of the sensor probe.

Since a capacitive alternating current circuit obeys Ohm's Law according to equation IV:

$$V = I X_c \quad \text{IV}$$

where V = voltage,
I = current,
$X_c$ = capacitive reactance,
one can measure the distance between the capacitor effect sensor plate and the opposing inner flow surface—the actual die gap—as a function of the voltage drop across the capacitor formed by the sensor plate, the opposite inner flow surface, and the dielectric between them.

By "optical sensors" it is meant that class of sensors which utilize the principles of light transmittance, absorbance and/or reflectance to detect the proximity of an object remote from the sensor such as by using a bundle of fiber optic filament sensors mounted flush with an inside flow surface of the die to measure the absorbance of the polymeric melt flowing through the die.

Approximately half of the fiber optical filaments should be "lighted" i.e. light is transmitted through them from a light source. The other half of the optical fiber filaments should be "dark", and employed to receive light that is reflected from the opposite inner flow surface of the die. Since the light emanating from the "lighted" optical fiber must travel across the die gap to the opposite inner flow surface, be reflected, and travel back across the die gap to the "dark" light receptive optical fibers, any change x in the die gap will result in a 2x change in light path, with a corresponding change in light intensity. Obviously, optical fiber proximity sensors are employed only when the extrudate is substantially transparent.

The present invention may employ just one such proximity sensor to detect local variation in the die gap. However, it is preferable that a plurality of such sensors be employed, so as to provide information on the die gap at various points along the inner flow surface of the die lips. Most preferred would be location of one proximity sensor aligned with each adjustment means so that localized die gap information concerning each adjustment is available.

In order to avoid creation of surface imperfections or "streaks" in the plastic melt or finished product, the inside flow surface of extrusion dies are polished to a mirror finish. The inside flow surface must typically possess a 2.0 micro-inch rms finish i.e. any surface imperfection must protrude less than 2.0 micro-inches above the inside flow surface of the die lip. In order to prevent creation of surface imperfections in the plastic melt or finished product due to the proximity sensor(s), the sensor(s) must (1) be mounted flush with the inside flow surface and (2) possess a polished "working surface" at least as smooth as the surrounding inside flow surface of the die lip. By "working surface" it is meant the portion of the proximity sensors which come into contact with the plastic melt.

The present invention may best be described by illustrating the invention as applied to an adjustable sheet-forming extrusion die. By "adjustable sheet-forming extrusion die" it is meant the general class of extrusion dies which are designed to extrude plastic melt in sheet-like or film form, and which are equipped with means to adjust the thickness of the extruded material by varying the die gap at intervals across the die. A specific example of an adjustable sheet-forming extrusion die is disclosed in U.S. Pat. No. 4,124,342, filed concurrently herewith, the disclosure of which is hereby incorporated by reference.

FIG. 1 illustrates the most preferred embodiment of the invention as applied to sheet-forming dies equipped with capacitance sensors. In operation, molten plastic is introduced into the die through inlet 20 by a pump (not shown) and is extruded in sheet-like or film form through a die gap created by a pair of die lips 13A and 13B. Adjustment bolts 10 control the die gap by pulling flexible die lip 13A away from, or pressing said flexible die lip 13A toward, the rigid die lip 13B. Capacitance sensors 12 are mounted flush with inside flow surface 14 of rigid die lip 13B in opposite relation to adjustment bolts 10. The sensors may be mounted in the flexible die lip, but it is preferable to locate them in the rigid die lip.

The present invention also provides a method for control of melt thickness distribution comprising (1) extruding a plastic melt through an adjustable extrusion die equipped with at least one proximity sensor, and (2) measuring the actual die gap while said plastic melt is flowing through said die with said proximity sensor. The method may be manual or automatic (closed loop). The manual system would comprise manually comparing the actual coutput value(s) of the proximity sensor(s) to a reference plot of measured die gap versus values of the proximity sensor(s) to determine the actual die gap and adjusting the die gap as required. A more sophisticated system would include a computer to continuously monitor and adjust the die gap. The present invention may also be employed in conjunction with closed loop melt thickness distribution systems which measure the melt thickness at a point after the melt has been extruded from the die. An example of such a system as applied to adjustable sheet-forming extrusion dies is disclosed in U.S. Pat. No. 4,124,342. The data from the proximity sensors may effectively replace the complicated summing calculations performed by the system disclosed therein, and provide real-time information on the effect a given die bolt adjustment had on the overall die gap distribution. This information, when coupled with the film thickness distribution information provided by downstream thickness sensors, will provide more accurate and efficient control of film thickness distribution.

Finally, the present invention also provides an efficient method for initial setting of die gap distribution prior to melt flow, thereby improving start-up efficiency.

EXAMPLES

The Examples discussed below illustrate the practice and advantages of the present invention. These Examples are illustrative only, and are specifically not intended to limit the scope of the present invention in any way.

EXAMPLE I

The rigid die lip of an 18 inch, 18 adjustment bolt, "removable lips," research die was drilled through at a position corresponding to and opposite adjustment bolt No. 7 to allow flush mounting of a cylindrical capacitance effect proximity sensor having an outside diameter of approximately 0.63 inches and a capacitance plate sensing diameter of approximately 0.32 inches. The capacitor plate and sensor housing, including the guard ring, were fabricated from carbon steel. The sensor was insulated with a high temperature resistant, castable ceramic potting compound. The working surface of the capacitance effect sensor fabricated for Example I was not polished to the same smoothness or finish of the inside flow surface of the die lip, and melt surface imperfections were therefore expected. In commercial operation, highly polished working surfaces are required. The sensor was electrically connected to a model AS-1021PA probe amplifier, manufactured by Mechanical Technology Incorporated. The amplifier's d.c. output was measured with a Fluke model 8000 A meter. The die was then pre-heated to 290° C. and a reference chart constructed by measuring the die gap width at bolt No. 7 with a taper gauge at various adjustment bolt settings and recording the capacitance sensor's voltage output at each setting. There was no polymer in the die during these measurements. This data is set out in Table I below.

TABLE I

| Measured Die Gap (inch) | Measured Voltage |
| --- | --- |
| .056 | +0.01 |
| .049 | −1.01 |
| .063 | +1.00 |
| .056 | +0.01 |
| .0525 | −0.50 |
| .0595 | +0.50 |

The above data were plotted to construct a reference graph of measured die gap versus measured voltage. The slope of the curve so produced was approximately 7 mils (0.007 inch) per volt.

EXAMPLE II

The capacitance-effect proximity sensor equipped die of Example I was attached to a poly(ethylene terephthalate) (PET) melt line. The PET melt was extruded (300 pounds per hour) through the die into a sheet which was brought around a drum and through constant speed drive rolls to maintain sheet tension while a sheet thickness distribution measurement was made with a NDC gamma backscatter gauge. Casting speed was 46 feet per minute. The temperature of the PET melt at the die was measured with a thermocouple and was initially 274° C.

As the PET melt began to pass through the die lips, the voltage reading from the capacitance-effect proximity sensor initially dropped due to the difference in dielectric constant of the polymer compared to air, and then remained constant. The voltage reading was zeroed.

The No. 7 bolt was adjusted several times during the extrusion run to change the voltage reading by a desired amount. Each time an adjustment was made the change in voltage reading was noted and a sheet thickness scan was made by employing the gamma backscatter thickness gauge. This data is listed in Table II. During the extrusion of the cast sheet, the capacitance-effect proximity sensor produced a streak in the cast sheet, as expected. During the course of these adjustments the PET melt temperature at the die rose slowly. By the fifth adjustment it had risen three degrees to 277° C.

EXAMPLE III

The effect of die and melt temperature variation upon sensor performance was evaluated by independently varying the die lip temperature and melt temperature, and recording the change in voltage readings. Bolt No. 7 was not adjusted during this evaluation. The data generated thereby is listed in Tables III and IV. Since the effect of temperature variation upon the die gap could not be independently evaluated, this data does not establish any temperature/voltage relationship. In any case, it is recommended that temperature variation across the width of the die be kept at a minimum, and that temperature of the polymer melt during an extrusion run be kept constant to avoid any variation in sheet thickness distribution due to viscosity variations. Of course, methods for compensation of temperature variation are well known. In addition, die or melt temperature variation may not affect operation of the optical fiber proximity sensor.

For adjustable extrusion dies which employ localized temperature control of the die lip itself, rather than the die blade, to adjust film thickness distribution, it is recommended that the proximity sensor(s) be mounted in the opposing die lip to minimize or eliminate any possible effect upon proximity sensor performance by variation in plastic melt temperature.

TABLE II

| Adjustment No. | Previous Voltage | Voltage After Adjustment | Voltage Change | Previous Film Thickness | Thickness After Adjustment | Thickness Change |
| --- | --- | --- | --- | --- | --- | --- |
| 1 | 0.00 | +0.08 | +0.08 | 7.20 mils | 7.79 | 0.59 mils |
| 2 | +0.08 | +0.04 | −0.04 | 7.79 | 7.50 | 0.29 |
| 3 | +0.04 | 0.00 | −0.04 | 7.50 | 7.26 | 0. |
| 4 | 0.00 | −0.04 | −0.04 | 7.26 | 6.98 | 0.28 |
| 5 | −0.04 | −0.06 | −0.02 | 6.98 | 6.84 | 0.14 |
| 6 | −0.06 | −0.08 | −0.02 | 6.84 | 6.74 | 0.10 |
| 7 | −0.08 | 0.00 | +0.08 | 6.74 | 7.23 | 0.49 |

TABLE III

Variations In Die Temperature with Melt Temperature Held Constant

| Temperature Adjustment | Previous Die Temperature | New Die Temperature | Change | Previous Voltage | New Voltage | Change in Voltage |
| --- | --- | --- | --- | --- | --- | --- |
| 1 | 290° C. | 300° C. | +10° C. | 0.00 | +0.014 | +0.014 |
| 2 | 300° C. | 290° C. | −10° C. | +0.014 | +0.006 | −0.008 |

TABLE IV

Variations In Melt Temperature With Die Temperature Held Constant

| Temperature Adjustment | Previous Melt Temperature | New Melt Temperature | Change | Previous Voltage | New Voltage | Change in Voltage |
| --- | --- | --- | --- | --- | --- | --- |
| 3 | 277° C. | 278° C. | +1° C. | .007 | .010 | +.003 |
| 4 | 278° C. | 270° C. | −8° C. | .010 | .019 | +.009 |

I claim:
1. An improved adjustable extrusion die comprising
(a) a plurality of inner flow surfaces in opposed relationship to each other, thereby defining a die gap,
(b) means for adjustment of the relationship of said inner flow surfaces to each other whereby said die gap may be expanded or contracted,
(c) at least one proximity sensor, selected from the group consisting of capacitance-effect and optical fiber sensors, mounted within and flush with at least one of said inner flow surfaces, said sensor possessing a working surface substantially as smooth as said inner flow surface, such that the actual die gap can be directly measured by said proximity sensor during operation of said adjustable extrusion die.

2. The improved extrusion die of claim 1 wherein there is one proximity sensor located in alignment with each adjustment means.

3. The improved extrusion die of claim 2 wherein said proximity sensor is a capacitance-effect sensor which measures the actual die gap by measuring the voltage drop across said actual die gap.

4. The improved extrusion die of claim 2 wherein said proximity sensor is an optical fiber sensor which measures the actual die gap by measuring the intensity of light originating from said proximity sensor and reflected from an opposed inner flow surface back to said proximity sensor.

5. The improved extrusion die of claim 3 wherein the die is a sheet-forming extrusion die.

6. The improved extrusion die of claim 3 wherein the die is a tubular-forming extrusion die.

7. A method for control of melt thickness distribution comprising
(i) extruding an extrudate through an adjustable extrusion die having
  (a) a plurality of inner flow surfaces in opposed relationship to each other, thereby defining a die gap,
  (b) means for adjustment of the relationship of said inner flow surfaces to each other whereby said die gap may be expanded or contracted,
  (c) at least one proximity sensor, selected from the group consisting of capacitance-effect and optical fiber sensors, mounted within and flush with at least one of said inner flow surfaces, said sensor possessing a working surface substantially as smooth as said inner flow surface, such that the actual die gap can be measured by said proximity sensor during operation of said adjustable extrusion die;
(ii) directly measuring the actual die gap while said extrudate is being extruded through said die.

8. The method of claim 7 wherein there is one proximity sensor located in alignment with each adjustment means.

9. The method of claim 8 wherein the proximity sensor is a capacitance-effect sensor which measures the actual die gap by measuring the voltage drop between the working surface of said sensor and the opposing inner flow surface.

10. The method of claim 8 wherein said proximity sensor is an optical fiber sensor which measures the actual die gap by measuring the intensity of light originating from said proximity sensor and reflected from an opposing inner flow surface back to said proximity sensor.

11. The method of claim 8 wherein said die is an adjustable sheet-forming extrusion die.

12. The method of claim 7 wherein said die is an adjustable tubular-forming extrusion die.

13. The method of claim 7 wherein the measuring step is performed by automatic computing means programmed to detect any variation from optimum die gap and to correct such variation by appropriate adjustment of the die adjustment means.

14. A method of sheet thickness control comprising
(i) extruding a plastic melt through a sheet-forming die comprising
  (a) a plurality of inner flow surfaces in opposed relationship to each other, thereby defining a die gap
  (b) means for adjustment of the relationship of said inner flow surfaces to each other whereby said die gap may be expanded or contracted,
  (c) at least one proximity sensor, selected from the group consisting of capacitance-effect and optical fiber sensors, mounted within and flush with at least one of said inner flow surfaces, said sensor prossessing a working surface substantially as smooth as said inner flow surface, such that the actual die gap can be measured by said proximity sensor during operation of said adjustable extrusion die,
thereby forming a sheet of plastic;
(ii) directly measuring the actual die gap while said plastic melt is flowing through said die
(iii) measuring the thickness of the sheet of plastic with thickness measuring means
(iv) correcting any deviation in
  (a) the measured die gap or
  (b) the measured thickness of the sheet of plastic by appropriate adjustment of said means for adjustment of the relationship of said inner flow surface to each other.

* * * * *